United States Patent
Hofstetter et al.

(10) Patent No.: US 6,774,608 B2
(45) Date of Patent: Aug. 10, 2004

(54) TURBINE DRIVEN POWER GENERATING DEVICE HAVING DC VOLTAGE INTERMEDIATE CIRCUIT AND STAR CONNECTED FILTER CAPACITORS

(75) Inventors: Bruno Hofstetter, Oberidessbach (CH); Ingo Golle, Gebenstorf (CH); Beat Ronner, Nussbaumen (CH); Martin Mullis, Zürich (CH)

(73) Assignee: ABB Schweiz AG, Baden (CH)

( * ) Notice: Subject to any disclaimer, the term of this patent is extended or adjusted under 35 U.S.C. 154(b) by 22 days.

(21) Appl. No.: 10/246,451

(22) Filed: Sep. 19, 2002

(65) Prior Publication Data

US 2003/0057923 A1 Mar. 27, 2003

(30) Foreign Application Priority Data

Sep. 25, 2001 (EP) .............................................. 01810934

(51) Int. Cl.[7] .......................... H02H 7/06; H02P 11/00; H02P 4/00; H02P 9/00
(52) U.S. Cl. .............................. 322/24; 322/22; 322/23
(58) Field of Search ................................ 322/17, 21–24

(56) References Cited

U.S. PATENT DOCUMENTS

| | | | | |
|---|---|---|---|---|
| 3,617,016 A | * | 11/1971 | Bolsey | 244/3.16 |
| 4,651,079 A | * | 3/1987 | Wills | 318/811 |
| 4,706,180 A | * | 11/1987 | Wills | 363/132 |
| 5,252,905 A | * | 10/1993 | Wills et al. | 318/807 |
| 5,400,237 A | * | 3/1995 | Flanagan et al. | 363/41 |
| 5,404,089 A | * | 4/1995 | Flanagan et al. | 318/811 |

(List continued on next page.)

FOREIGN PATENT DOCUMENTS

| | | |
|---|---|---|
| EP | 0682401 A1 | 11/1995 |
| EP | 0809879 | 12/1997 |
| EP | 1069673 A1 | 1/2001 |
| SE | 7804025-0 | 11/1979 |

OTHER PUBLICATIONS

Luigi Malesani et al., "AC/DC/AC PWM Converter with Reduced Energy Storage in the DC Link", IEEE Transactions on Industry Applications, IEEE Inc. New York, US, Ed. 31, No. 2, Mar. 1, 1995, pp. 287–292, XP000513103.

Michael Lindgren et al., "Control of a Voltage source Converter Connected to the Grid through an LCL–filter Application to Active Filtering", Power Electronics Specialists Conference, 1998, PESC 98 Record 29th Annual IEEE Fukuoka, Japan, May 17–22, 1998, New York, NY, USA IEEE, XP010294951.

Michael Lindgren, "Feed Forward—Time Efficient Control of a Voltage Source Converter Connected to the Grid by Lowpass Filters", Power Electronics Specialist Conference, 1995, 26th Annual IEEE, Atlanta, GA, USA, Jun. 18–22, 1995, XP010160677.

*Primary Examiner*—Nicholas Ponomarenko
*Assistant Examiner*—Pedro J. Cuevas
(74) *Attorney, Agent, or Firm*—Burns, Doane, Swecker & Mathis, L.L.P.

(57) ABSTRACT

A power generating device is specified, which comprises a generator (1), which is coupled to a drive unit, in particular to a turbine, and is connected via a rectifier (2) to a DC voltage intermediate circuit (3), an inverter (4), which is connected to the DC voltage intermediate circuit (3) and, on the AC voltage output side, has n phases with n AC voltage connections (5), and a filter arrangement (6), which is connected to the AC voltage connections (5). Furthermore, the filter arrangement (6) has a first filter inductance (7) and a second filter inductance (8), which is connected in series with the first, for each AC voltage connection (5), with a filter capacitor (9) being connected to the junction point of the first filter inductance (7) and the second filter inductance (8), and the filter capacitors (9) being connected to one another in a star circuit at a star point (10).

10 Claims, 5 Drawing Sheets

U.S. PATENT DOCUMENTS

| | | | | |
|---|---|---|---|---|
| 5,790,392 A | * | 8/1998 | Eklund et al. | 363/49 |
| 5,811,939 A | | 9/1998 | Herniak | 315/313 |
| 5,812,383 A | * | 9/1998 | Majid et al. | 363/21.05 |
| 5,903,116 A | | 5/1999 | Geis et al. | 318/140 |
| 5,930,121 A | * | 7/1999 | Henry | 363/16 |
| 5,959,853 A | * | 9/1999 | Kos | 363/59 |
| 5,982,154 A | * | 11/1999 | Kanazawa et al. | 322/29 |
| 6,011,704 A | * | 1/2000 | Coleman | 363/37 |
| 6,020,713 A | * | 2/2000 | Geis et al. | 318/801 |
| 6,118,678 A | * | 9/2000 | Limpaecher et al. | 363/60 |
| 6,121,749 A | * | 9/2000 | Wills et al. | 318/811 |
| 6,154,378 A | | 11/2000 | Peterson et al. | 363/37 |
| 6,175,217 B1 | * | 1/2001 | Da Ponte et al. | 322/19 |
| 6,188,203 B1 | * | 2/2001 | Rice et al. | 322/25 |
| 6,603,216 B2 | * | 8/2003 | Costello | 290/41 |
| 6,683,389 B2 | * | 1/2004 | Geis | 290/40 C |
| 6,696,820 B2 | * | 2/2004 | Peter | 322/24 |
| 6,700,331 B2 | * | 3/2004 | Benensohn | 315/224 |
| 6,703,719 B1 | * | 3/2004 | McConnell | 290/52 |
| 6,713,990 B1 | * | 3/2004 | Giraud et al. | 322/23 |
| 6,717,385 B2 | * | 4/2004 | Asada et al. | 322/24 |
| 6,717,386 B1 | * | 4/2004 | Kanasugi et al. | 322/27 |

* cited by examiner

TURBINE DRIVEN POWER GENERATING DEVICE HAVING DC VOLTAGE INTERMEDIATE CIRCUIT AND STAR CONNECTED FILTER CAPACITORS

This application claims priority under 35 U.S.C. §§ 119 and/or 365 to 01810934.8 filed in Europe on Sep. 25, 2001; the entire content of which is hereby incorporated by reference.

FIELD OF THE INVENTION

The present invention relates to the field of power generation. It relates in particular to a power generating device which can be connected in particular to a public AC voltage supply network and/or to an island network, as claimed in the pre-characterizing clause of the independent claim.

BACKGROUND OF THE INVENTION

Nowadays, power generating devices are used mainly to generate additional electrical power for conventional electrical AC voltage supply networks and/or for supplying island networks in remote areas. One such power generating device is disclosed, by way of example, in U.S. Pat. No. 5,903,116. In this document, the power generating device has a drive unit, which is in the form of a turbine. The drive unit is coupled to a generator, which is connected to a DC voltage intermediate circuit via a passive rectifier. The DC voltage intermediate circuit is formed from two capacitors, which are used as an electrical energy store. Furthermore, the DC voltage intermediate circuit is connected to an inverter which, on the AC voltage output side, has n phases with n AC voltage connections, where, in particular, n is equal to 3. Furthermore, the DC voltage intermediate circuit is connected to a balancing apparatus, which is formed from two series-connected power semiconductor switches, with a diode being connected back-to-back in parallel with each power semiconductor switch. The junction point of the power semiconductor switches is connected via an inductance to the junction point of the two capacitors in the DC voltage intermediate circuit. Furthermore, the junction point of the power semiconductor switches is in the form of a neutral point connection, with the neutral point connection being used as a connection for a neutral point of an island network. The voltage on the two capacitors in the DC voltage intermediate circuit can be balanced by appropriate actuation of the power semiconductor switches. Furthermore, the AC voltage connections of the inverter in the power generating device are connected to a conventional filter arrangement, with the filter arrangement being connected to the electrical AC voltage supply network. A conventional filter arrangement such as this is specified, by way of example, in EP 0 682 401 A1. In this document, each AC voltage connection of a three-phase inverter is connected to a filter inductance, and each filter inductance is connected to a filter capacitor, with the junction point of the filter inductance and the filter capacitor forming a network connection.

The balancing apparatus which has been mentioned above is subject to the problem that undesirable fluctuations can occur in the DC voltage of the DC voltage intermediate circuit in the case of an alternating component, particularly if any current via the neutral point connection has a relatively high-frequency alternating component. Furthermore, any DC component in the current via the neutral point connection leads to the DC voltage intermediate circuit being charged or discharged, depending on the mathematical sign of the current. However, charging of the DC voltage intermediate circuit can lead to an unacceptably high DC voltage in the DC voltage intermediate circuit, which can lead to a flashover as a result of which the DC voltage intermediate circuit, in particular the capacitors as well as the components of the rectifier and of the inverter, may be damaged or destroyed. Furthermore, a DC component such as this as well as any alternating component that the current via the neutral point connection may have leads to a shift in the voltage relationships on the two capacitors in the DC voltage intermediate circuit. This can lead to an unacceptably high voltage on one of the capacitors, which can damage or destroy that capacitor. Any unbalance such as this can be coped with or overcome only by monitoring the voltage on each capacitor in the DC voltage intermediate circuit and by complex actuation of the power semiconductor switches, coupled to the monitoring process.

In the event of any disturbances in the electrical AC voltage supply network, a filter arrangement as mentioned above cannot keep such disturbances away from the inverter in the power generating device, by virtue of its design with a filter capacitor and a filter inductance. Furthermore, medium-frequency and high-frequency ripple control signals which are modulated onto the network voltage are substantially filtered out by a filter arrangement such as this, although ripple control signals such as these are required for information and/or control purposes, depending on the configuration of the power generating device.

SUMMARY OF THE INVENTION

The object of the invention is therefore to specify a power generating device, which is robust to disturbances in an electrical AC voltage supply network which may be connected to the power generating device. This object is achieved by the features of claim 1. Advantageous developments of the invention are specified in the dependent claims.

The power generating device according to the invention comprises a generator which is coupled to a drive unit, in particular to a turbine, and is connected via a rectifier to a DC voltage intermediate circuit, with an inverter being provided, which is connected to the DC voltage intermediate circuit and, on the AC voltage output side, has n phases with n AC voltage connections. A filter arrangement is also connected to the AC voltage connections of the inverter. According to the invention, the filter arrangement has a first filter inductance and a second filter inductance, which is connected in series with the first, for each AC voltage connection, with a filter capacitor being connected to the junction point of the first filter inductance and the second filter inductance. Furthermore, the filter capacitors are connected in a star circuit. This filter arrangement advantageously allows disturbances in an electrical AC voltage supply network which can be connected to the filter arrangement to be very largely kept away from the inverter, since the filter arrangement represents a high input impedance, seen from the electrical AC voltage supply network. Furthermore, signals which are modulated onto the network voltage of the electrical AC voltage supply network, such as ripple control signals, can pass through the filter arrangement without being significantly filtered out.

In one preferred embodiment of the power generating device according to the invention, a balancing apparatus is provided, which is connected to the DC voltage intermediate circuit and is formed from two series-connected controllable power semiconductor switches, each having a back-to-back parallel-connected diode. According to the invention, the junction point of the power semiconductor switches is connected to the star point of the filter capacitors. The star point thus advantageously forms a neutral point connection, for example for a neutral point of an island network which is to be fed in addition to the electrical AC voltage supply network. A further advantage is that any current flowing via this neutral point connection, in particular with a DC component and/or an alternating component, and in particular an alternating component of relatively high frequency, will have no significant influence on the way in which the voltage is split in the DC voltage intermediate circuit of the power generating device, so that the DC voltage which is present in the DC voltage intermediate circuit is not significantly influenced by such disturbances. Furthermore, the balancing apparatus advantageously makes it possible to set the neutral point to a potential which can be predetermined.

This and further objects, advantages and features of the present invention will become evident from the following detailed description of a preferred exemplary embodiment of the invention, and in conjunction with the drawing.

The reference symbols which are used in the drawing, and their meanings, are listed in summarized form in the list of reference symbols. In principle, identical parts are provided with the same reference symbols in the figures. The described embodiment is used as an example of the subject matter of the invention, and has no restrictive effect.

DETAILED DESCRIPTION OF THE INVENTION

Figure 1:
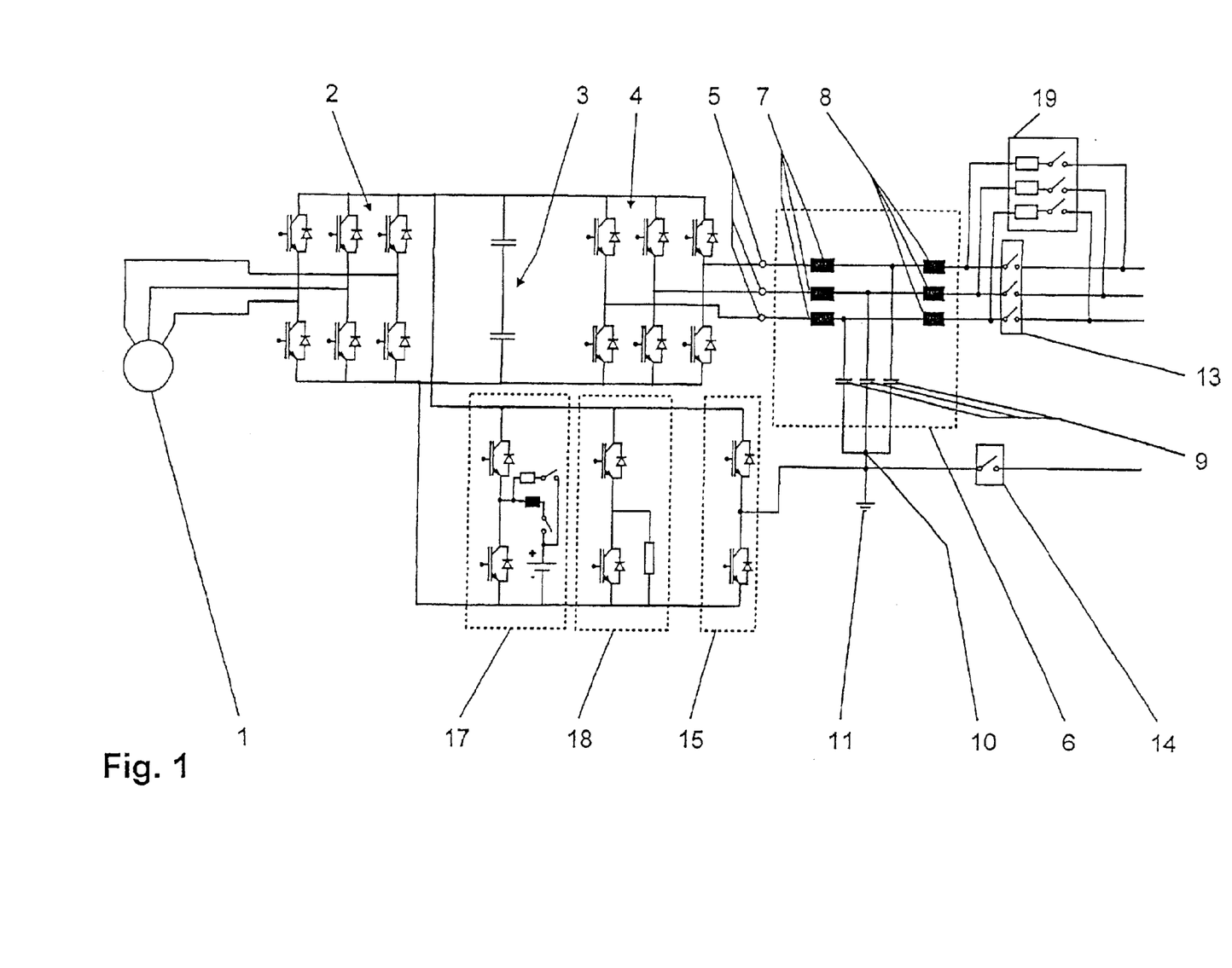
FIG. 1 shows a first embodiment of a power generating device according to the invention.

FIG. 1 shows a first embodiment of a power generating device according to the invention. The power generating device according to the invention comprises a drive unit, in particular a turbine, which is preferably in the form of a gas turbine. For the sake of clarity, this drive unit is not shown in FIG. 1. The drive unit is coupled to a generator 1, whose AC voltage outputs are connected to a rectifier 2, with the DC voltage side of the rectifier 2 being connected to a DC voltage intermediate circuit 3. According to FIG. 1, the rectifier 2 is preferably in the form of a controllable three-phase rectifier 2, which is formed from three pairs of arms, with each pair of arms being formed from two series-connected controllable power semiconductor switches, in particular bipolar transistors whose gate electrode is arranged in an isolated manner, and a diode which is connected back-to-back in parallel with each power semiconductor switch. The controllable rectifier 2 means that it is possible to influence the power factor of the generator 1 and hence to make better use of the generator 1, in which case, in addition, it is possible to reduce rotor losses in the generator 1.

As shown in FIG. 1, the DC voltage intermediate circuit 3 is formed by two capacitors. Furthermore, an energy storage device 17 is provided, which is used for charging, and for supplying electrical power to, the DC voltage intermediate circuit 3, in particular during the starting phase of the turbine and when positive sudden load changes occur during possible island network operation of the power generating device, with the energy storage device 17 being connected to the DC voltage intermediate circuit 3. During normal operation of the power generating device 17, the energy storage device 17 is also used for temporary storage of electrical energy from the DC voltage intermediate circuit 3. Furthermore, a discharge device 18 is connected to the DC voltage intermediate circuit 3 and is used for discharging the DC voltage intermediate circuit 3, in particular in the event of overvoltages and/or when the power generating device is switched off. Furthermore, an n-phase inverter 4 is connected to the DC voltage intermediate circuit 3, with the inverter 4 having n AC voltage connections 5. By way of example, FIG. 1 shows the inverter 4 with three AC voltage connections 5, so that n is equal to 3.

A filter arrangement 6 is connected to the AC voltage connections 5 as shown in FIG. 1. According to the invention, the filter arrangement 6 has a first filter inductance 7 and a second filter inductance 8, which is connected in series with the first, for each AC voltage connection, with a filter capacitor 9 being connected to the junction point of the first filter inductance 7 and the second filter inductance 8. Furthermore, the filter capacitors 9 in the filter arrangement 6 are connected to one another in a star circuit at a star point 10. The first filter inductance 7, the second filter inductance 8 and the filter capacitor 9 advantageously make it possible to filter out harmonics which are produced by the inverter 4, in order to make it possible to comply with the appropriate feed requirements for an electrical AC voltage supply network which can be connected to the filter arrangement 6. The filter arrangement 6 represents a high input impedance to the power generating device, as seen by the electrical AC voltage supply network. In consequence, any disturbances which occur in the electrical AC voltage supply network can advantageously very largely be kept away from the power generating device, in particular away from the inverter 4, by the filter arrangement 6.

Figure 2:
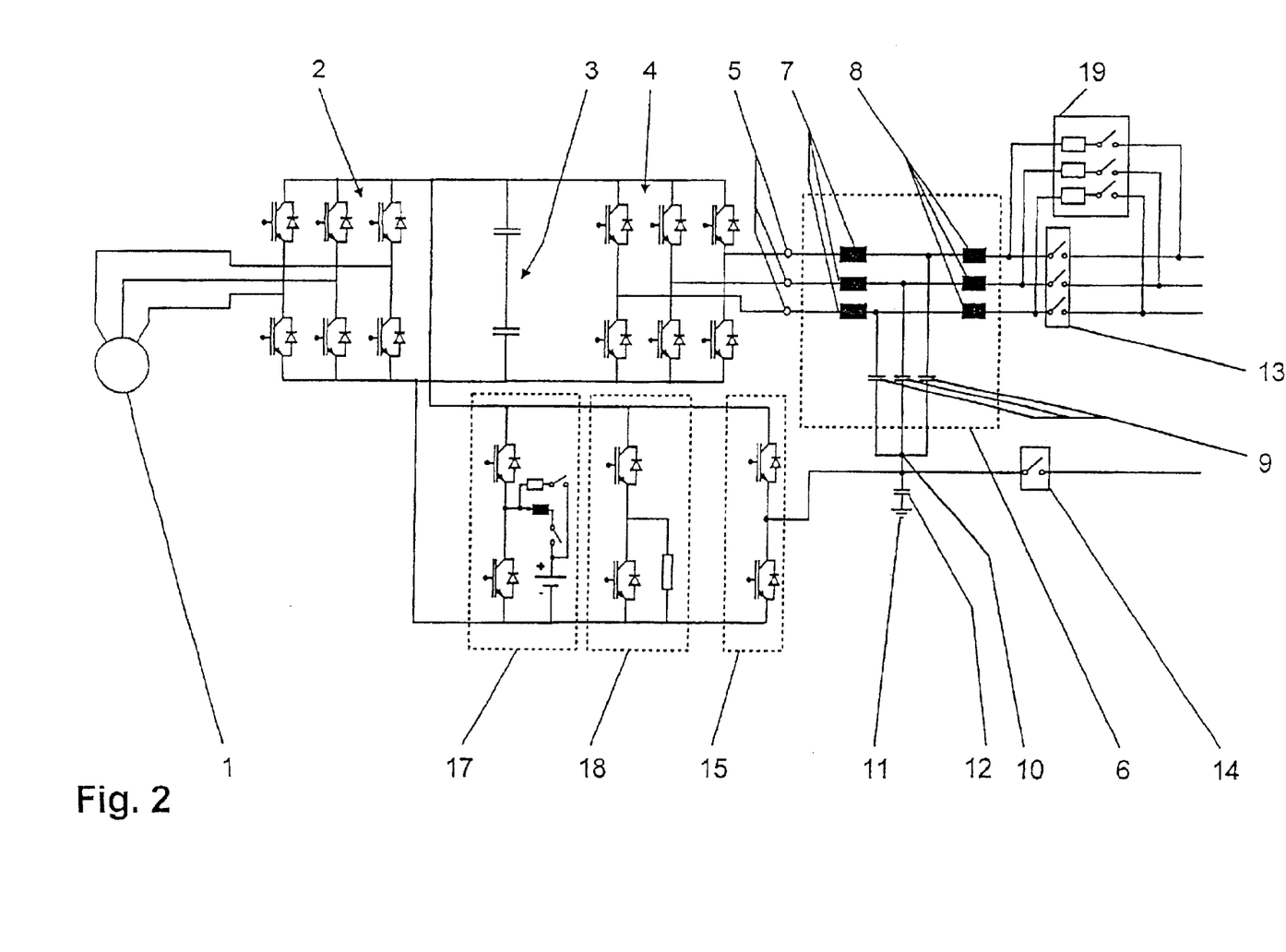
FIG. 2 shows a second embodiment of a power generating device according to the invention.

As shown in FIG. 1, the star point 10 is, according to the invention, connected to ground potential 11, as a result of which any currents which are generated by harmonics produced by the inverter 6 and/or are produced by medium-frequency and high-frequency components in the network voltage of the electrical AC voltage supply network can be dissipated. In a second embodiment of the power generating device according to the invention, and as shown in FIG. 2, the star point 10 is connected to ground potential 11 via a grounding capacitor 12. This advantageously makes it possible to reduce sudden potential changes at the star point 10 with respect to ground potential 11.

In the embodiments of the power generating device according to the invention as shown in FIG. 1 and FIG. 2, the second filter inductance 8 is connected to a first network isolating switch 13. Individual phases of the electrical AC voltage supply network can thus be connected to the power generating device, in particular to the filter arrangement 6, and can be disconnected from the filter arrangement 6 in the case of pure island operation or in the event of a disturbance, for example in the event of a failure of the electrical AC voltage supply network. The power generating device connections which are required for connection of the island network, in particular between the filter arrangement 6 and the first network isolating switch 13, are not illustrated in FIG. 1 or FIG. 2, for the sake of clarity. Furthermore, as shown in FIG. 1 and FIG. 2, a charging device 19 is provided, and is connected to the second filter inductance 8. The charging device 19 can also be connected to individual phases of the electrical AC voltage supply network and, for this purpose, in each case has an isolating switch with a series-connected resistor for each connection for the second filter inductances 8. The charging device 19 advantageously makes it possible to charge the DC voltage intermediate circuit 3, when the isolating switches are closed, from the electrical AC voltage supply network via the resistors, the filter arrangement 6 and the inverter 4.

Furthermore, as shown in FIG. 1 and FIG. 2, a balancing apparatus 15 is provided which is connected to the DC voltage intermediate circuit 3 and is formed from two series-connected controllable power semiconductor switches, each having a back-to-back parallel-connected diode. The junction point of the power semiconductor switches is in this case, according to the invention, connected to the star point 10. This connection means that the star point forms a neutral point connection, for example for an island network which can be fed in addition to the electrical AC voltage supply network, in which case a neutral point of the island network, which can be connected to the neutral point connection, can advantageously be set to a potential which can be predetermined by means of appropriate actuation of the power semiconductor switches in the balancing apparatus. Any current flowing via this neutral point connection, as a result of an unbalance in the island network, in particular a current with a DC component and/or an alternating component, furthermore has no significant influence on the DC voltage intermediate circuit 3 of the power generating device, since there is no direct connection, or any connection, as is known from the prior art, of the junction point of the two power semiconductor switches via a passive component, in particular via an inductance, to the DC voltage intermediate circuit 3. The DC voltage which is present in the DC voltage intermediate circuit 3 is therefore not significantly influenced by such current components.

Figure 3:
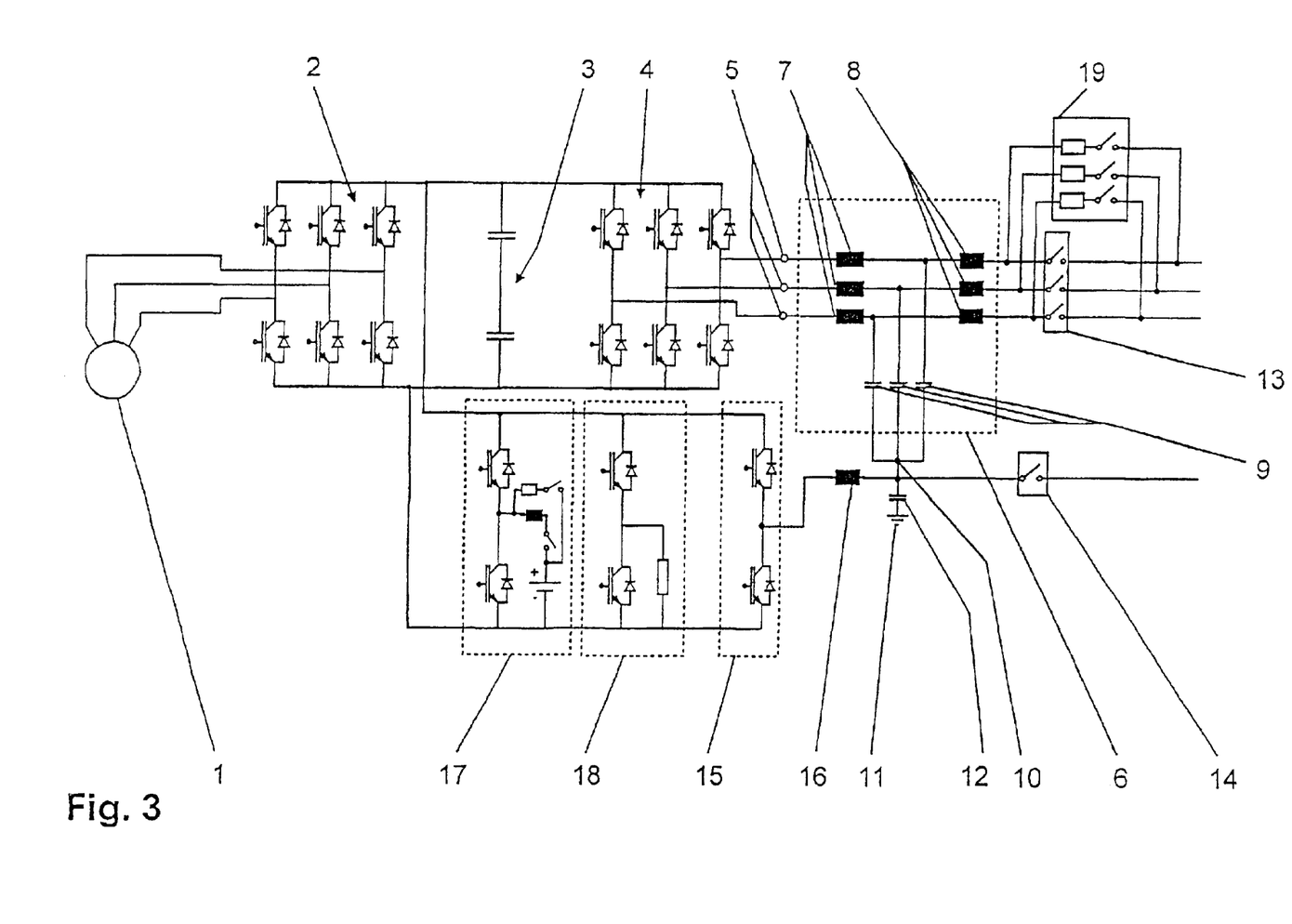
FIG. 3 shows a third embodiment of a power generating device according to the invention.

In a third embodiment of the power generating device according to the invention and as shown in FIG. 3, the junction point of the power semiconductor switches in the balancing apparatus 15 is connected to the star point 10 via a smoothing inductance 16. This smoothing inductance 16 allows the current, as mentioned above, flowing via the neutral point connection to be smoothed, in particular if this current has an alternating component.

Figure 4:
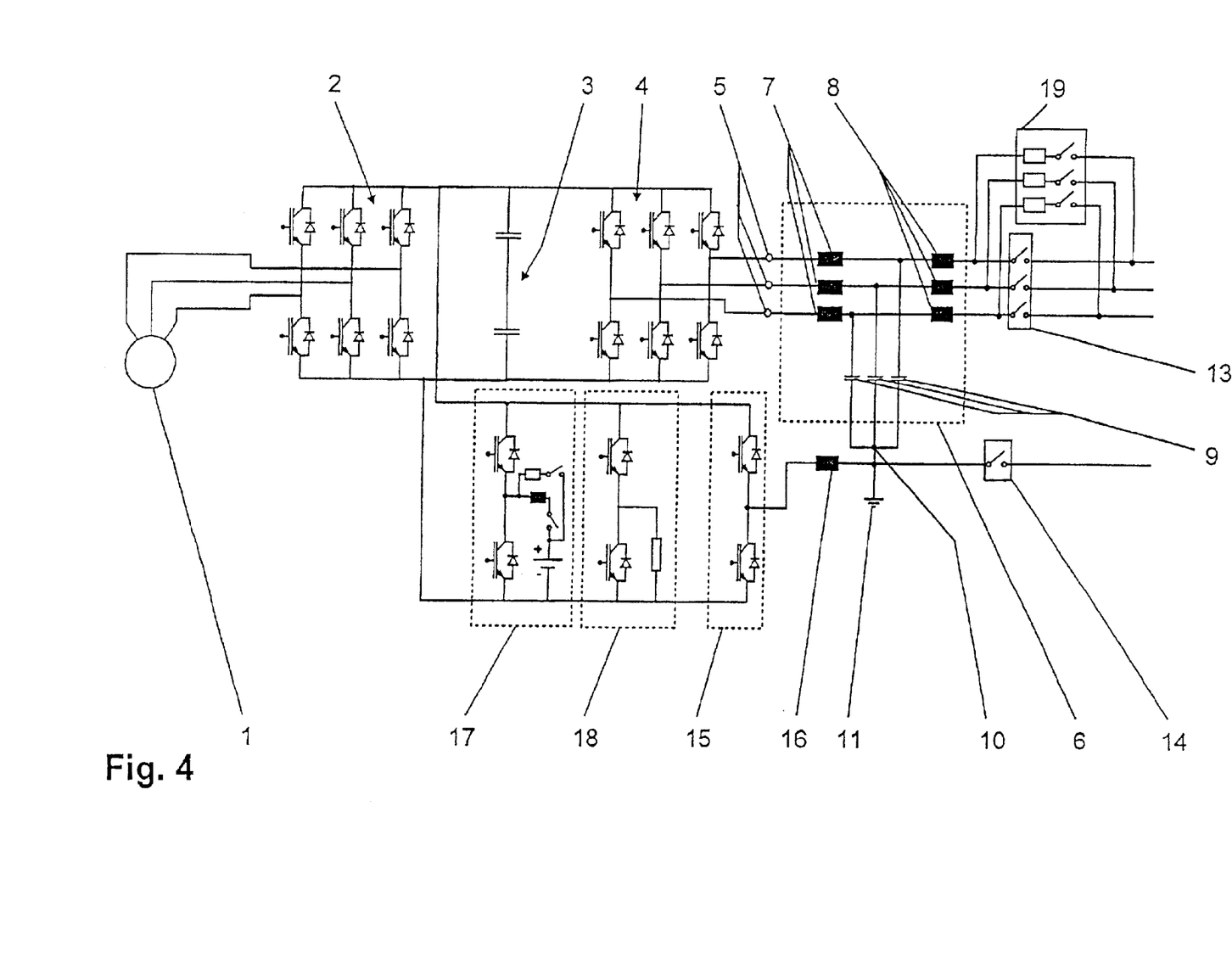
FIG. 4 shows a fourth embodiment of a power generating device according to the invention.

In a fourth embodiment of the power generating device according to the invention and as shown in FIG. 4, the smoothing inductance 16 is connected, in a corresponding way to that of FIG. 3, to the star point 10, but the star point 10 is connected directly to ground potential 11, and not via the grounding capacitor 12 as shown in FIG. 3. By saving the grounding capacitor 12, this embodiment of the power generating device according to the invention represents a low-cost alternative according to the invention to the embodiment of the power generating device according to the invention as shown in FIG. 3.

As shown in FIG. 1, FIG. 2, FIG. 3 and FIG. 4, the star point 10 is connected to a second network isolating switch 14. This allows the neutral point of the island network to be connected to the power generating device, in particular to the balancing apparatus 15, or to be disconnected from it in the event of a disturbance, for example in the event of a failure of the island network.

Figure 5:
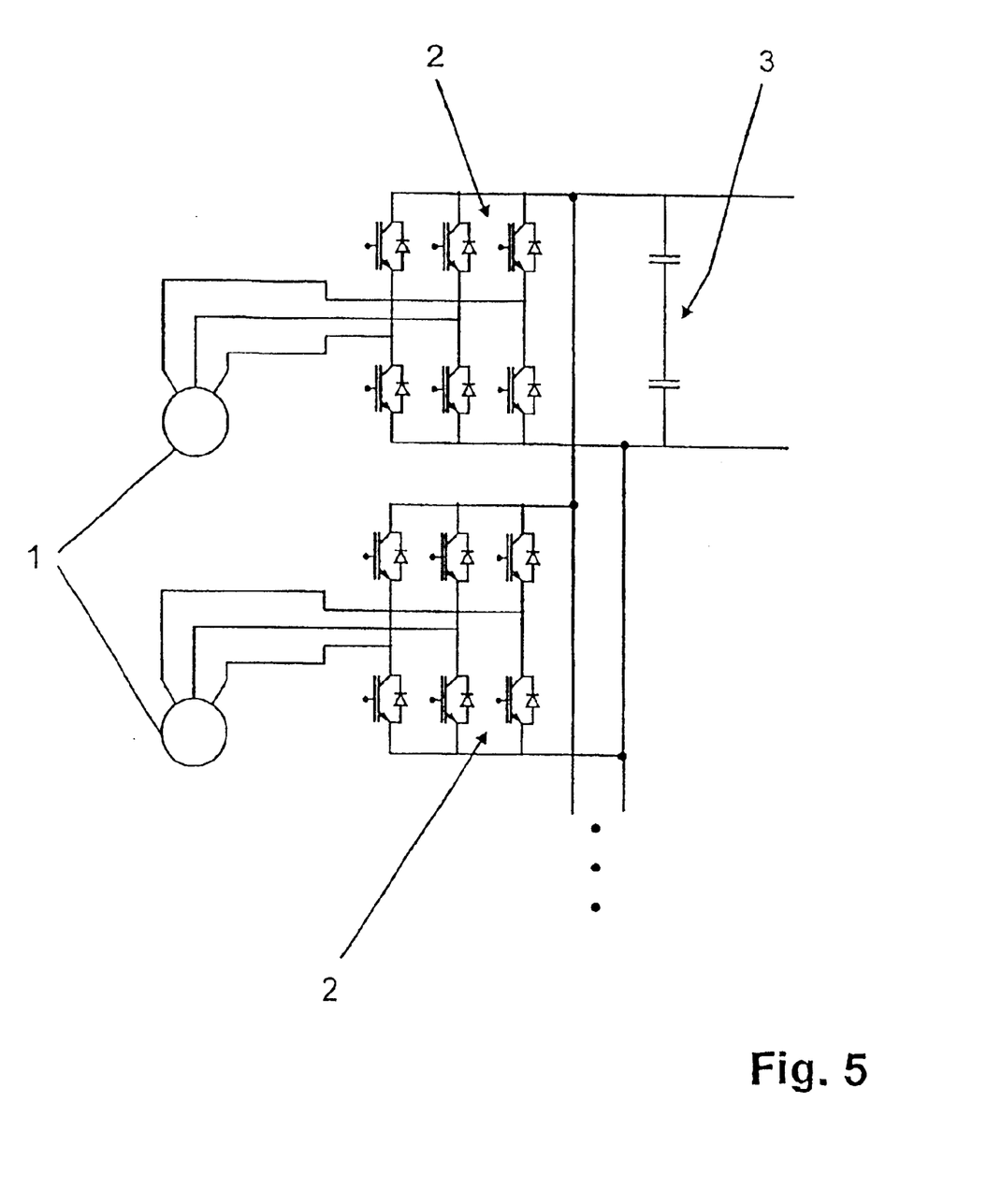
FIG. 5 shows a detail -of a fifth embodiment of a power generating device according to the invention.

FIG. 5 shows a detail of a fifth embodiment of the power generating device according to the invention. This fifth embodiment differs from the embodiments of the power generating device according to the invention as shown in FIG. 1 to FIG. 4 in that the DC voltage side of at least one further rectifier 2 is connected to the DC voltage intermediate circuit 3, with the rectifier 2 being connected to the AC voltage outputs of a further generator 1, and the generator 1 being coupled to a further drive unit, which is not shown in FIG. 4 for the sake of clarity. The drive unit, in particular a turbine, is preferably in the form of a gas turbine. This at least one further rectifier 2 together with the upstream generator 1 and the drive unit allows the DC voltage in the DC voltage intermediate circuit 3 to be set largely independently of the instantaneous output of the individual generators 1.

Overall, the power generating device according to the invention can be implemented very easily and at low cost, since the circuit complexity can be kept at an extremely low level and, furthermore, only a small number of components are required for this design.

List of Reference Symbols

1 Generator
2 Rectifier
3 DC voltage intermediate circuit
4 Inverter
5 AC voltage connections
6 Filter arrangement
7 First filter inductance
8 Second filter inductance
9 Filter capacitor
10 Star point
11 Ground potential
12 Grounding capacitor
13 First network isolating switch
14 Second network isolating switch
15 Balancing apparatus
16 Smoothing inductance
17 Energy storage device
18 Discharge device
10 Charging device

What is claimed is:

1. A power generating device comprising:
   a generator, which is coupled to a drive unit, and is connected via a rectifier to a DC voltage intermediate circuit,
   an inverter, which is connected to the DC voltage intermediate circuit and, on the AC voltage output side, has n phases with n AC voltage connections, and
   a filter arrangement, which is connected to the AC voltage connections, wherein
   the filter arrangement has a first filter inductance and a second filter inductance, which is connected in series with the first, for each AC voltage connection, and a filter capacitor is connected to the junction point of the first filter inductance and the second filter inductance, wherein the filter capacitors are connected to one another in a star circuit at a star point, wherein the star point is connected to ground potential, wherein a balancing apparatus is provided, which is connected to the DC voltage intermediate circuit and is formed from two series-connected controllable power semiconductor switches, each having a back-to-back parallel-connected diode, and wherein the junction point of the power semiconductor switches is connected to the star point.

2. The power generating device as claimed in claim 1, wherein the rectifier is in the form of a controllable three-phase rectifier.

3. The power generating device as claimed in claim 1, wherein the star point is connected to ground potential via a grounding capacitor.

4. The power generating device as claimed in claim 1, wherein the junction point of the power semiconductor switches is connected to the star point via a smoothing inductance.

5. The power generating device as claimed in claim 1, wherein the second filter inductance is connected to a first network isolating switch.

6. The power generating device as claimed in claim 1, wherein a charging device is provided, which is connected to the second filter inductance, with the charging device in each case having an isolating switch with a series-connected resistance for each connection for the second filter inductances.

7. The power generating device as claimed in claim 6, wherein the star point is connected to a second network isolating switch.

8. The power generating device as claimed in claim 1, wherein at least one further rectifier is connected to the DC voltage intermediate circuit, with the at least one further rectifier being connected to a further generator, and the further generator being coupled to a further drive unit.

9. The power generating device of claim 1, wherein the drive unit is a turbine.

10. The power generating device of claim 8, wherein the further drive unit is in the form of a turbine.

* * * * *